Aug. 4, 1953    J. J. WOLF, JR    2,647,449
REFLEX CAMERA WITH A PICTURE STRIP MOVING
TRANSVERSELY ACROSS THE CAMERA BOX
Filed Sept. 13, 1950    3 Sheets-Sheet 1
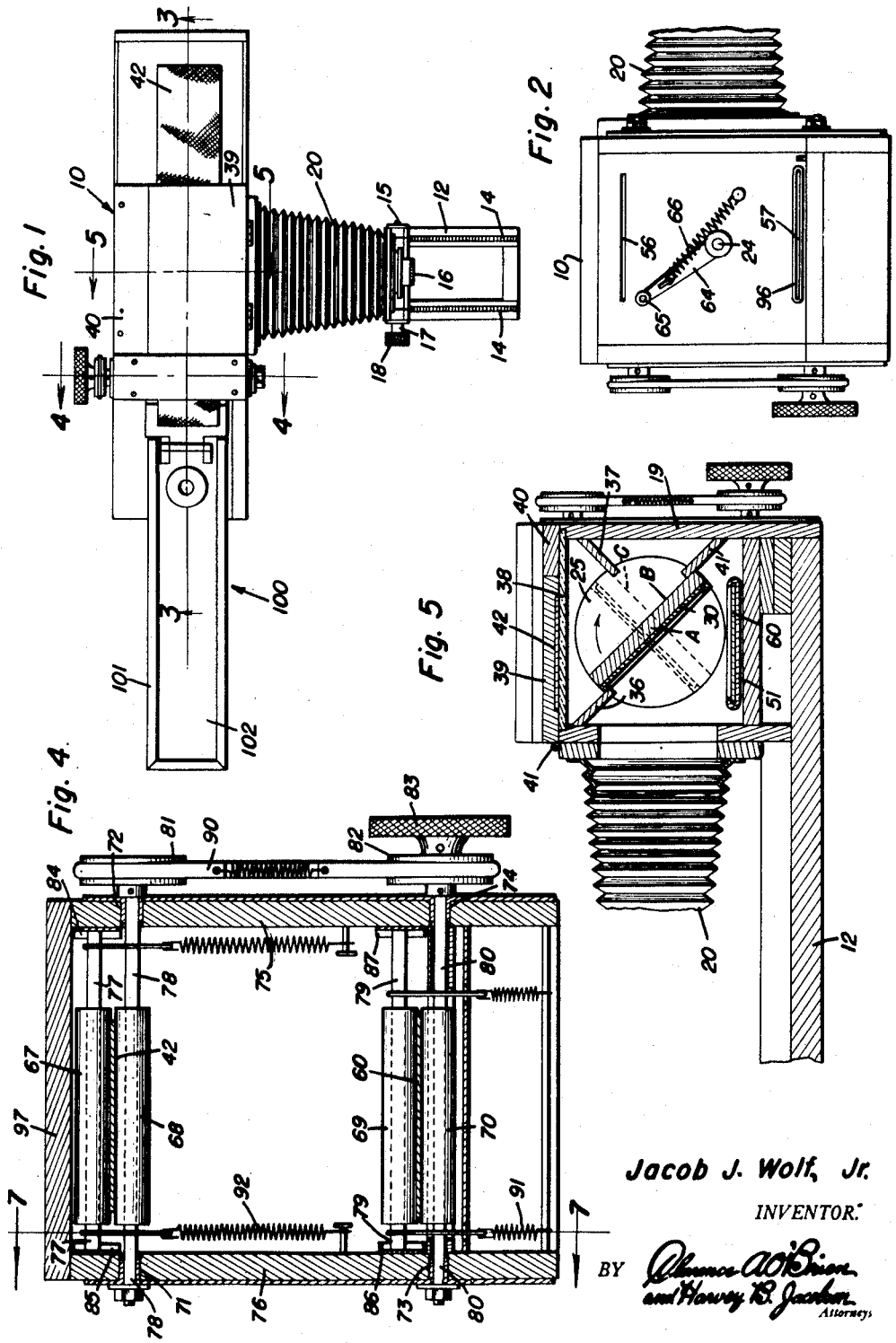
Jacob J. Wolf, Jr.
INVENTOR.

Aug. 4, 1953
J. J. WOLF, JR
2,647,449
REFLEX CAMERA WITH A PICTURE STRIP MOVING
TRANSVERSELY ACROSS THE CAMERA BOX
Filed Sept. 13, 1950
3 Sheets-Sheet 2
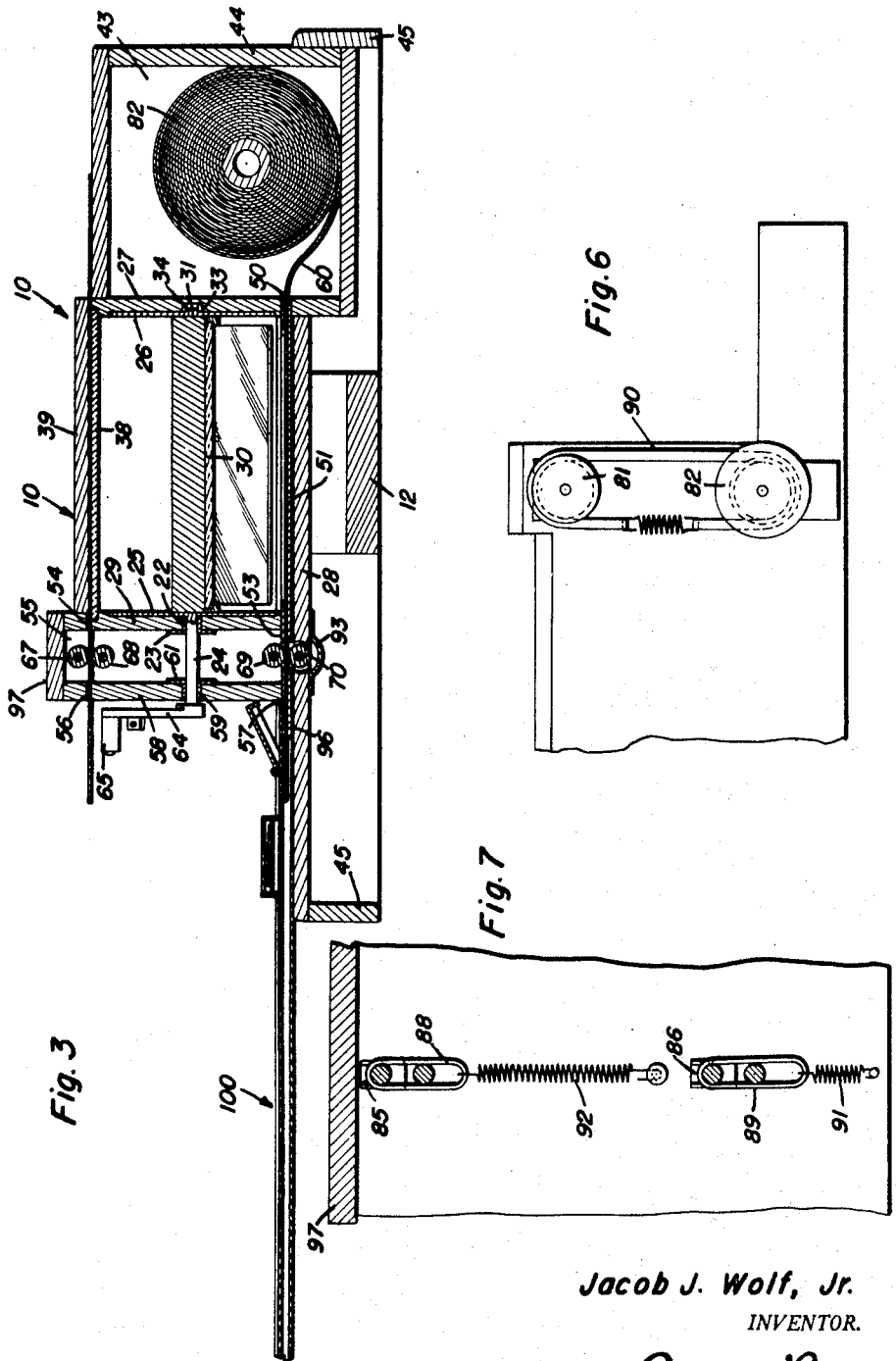
Jacob J. Wolf, Jr.
INVENTOR.

Aug. 4, 1953  J. J. WOLF, JR  2,647,449
REFLEX CAMERA WITH A PICTURE STRIP MOVING
TRANSVERSELY ACROSS THE CAMERA BOX
Filed Sept. 13, 1950  3 Sheets-Sheet 3
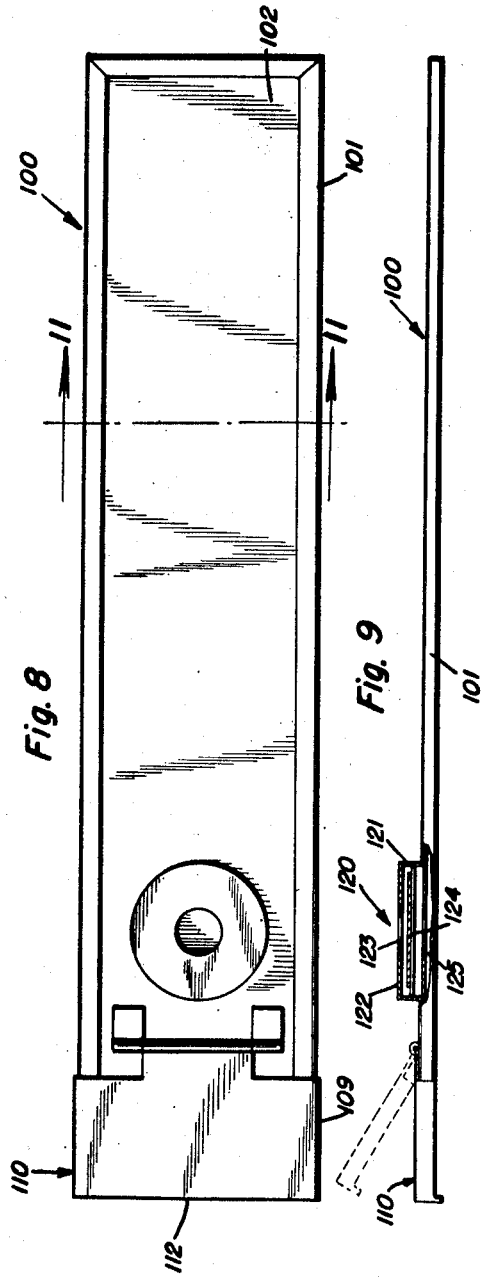
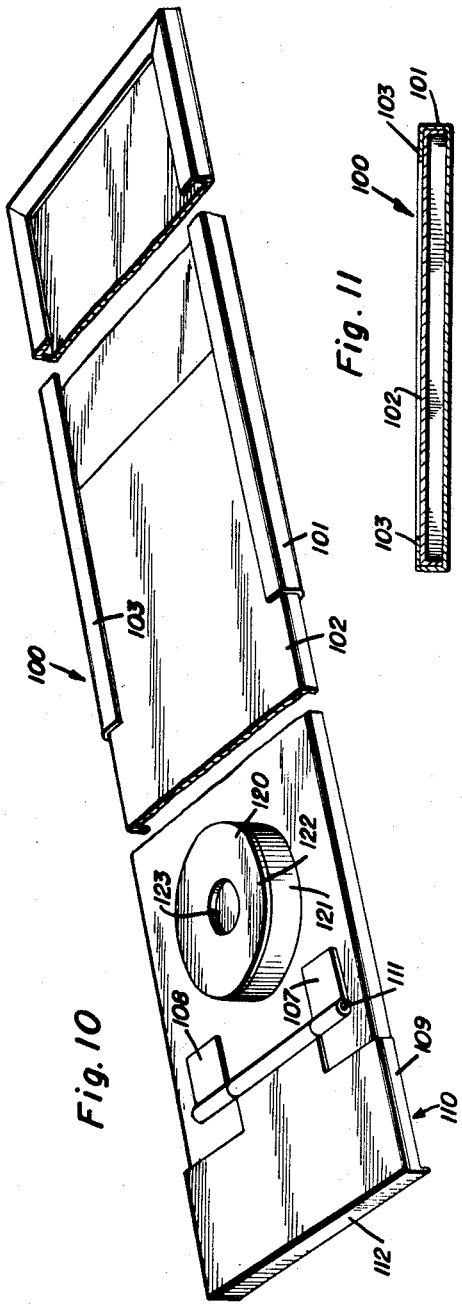
Jacob J. Wolf, Jr.
INVENTOR.

Patented Aug. 4, 1953

2,647,449

UNITED STATES PATENT OFFICE 2,647,449

REFLEX CAMERA WITH A PICTURE STRIP MOVING TRANSVERSELY ACROSS THE CAMERA BOX

Jacob J. Wolf, Jr., New Orleans, La.

Application September 13, 1950, Serial No. 184,644

4 Claims. (Cl. 95—13)

1

This invention relates to cameras by means of which pictures, drawings, documents, and other objects may be photographically reproduced.

With cameras of the above-named type a large number of photographic reproductions is usually made at a time and therefore the time and the individual treatment which is devoted to a single reproduction must be reduced as much as possible. If film continuously unreeled from a storage spool or roll is used it is necessary, especially when development of the film occurs only after a series of exposures have been made, to keep a complete record of the reproductions made in order to be able to locate an individual reproduction and in order to avoid omissions or duplications.

The main object of this invention is to provide a camera which permits careful individual treatment of the picture reproduction, if necessary, and which also permits rapid manipulation when such individual treatment has been performed or is unnecessary.

A further object of the invention consists in providing a camera in which the film strip, while in a substantially horizontal position, can move in a transverse direction with respect to the optical axis of the camera, thus permitting an easy and convenient operation and an inspection of the image before the exposure is made, and in providing at the end of the path of the film strip a flat channel-like film receiving container into which the film is advanced and in which development can be carried out so that no dark room is necessary for making a large number of reproductions.

It is moreover an object of the invention to provide a reflex camera with a movable mirror which is adapted for rapid reproduction work, while also permitting careful inspection of the image which is thrown on the sensitized layer.

A further object of the invention consists in using the mirror of the reflex camera for throwing the images of the objects or pictures to be reproduced on a horizontal surface on which the film moves transversely with respect to the longitudinal axis of the camera, the arrangement being such that a simple manipulation brings the mirror alternatively into a position in which the image may be inspected and into a position in which the image is thrown upon the film by the mirror.

A further object of the invention consists in providing a translucent non-transparent strip which is moved along with the film at the same speed at which the film moves and which may

2 serve to make a record of the reproduction and notes which relate either to the reproduction or to the treatment thereof, the place on the said record containing strip on which the notes are made corresponding directly to the place of the photographic reproduction of the film with which said notes are associated.

It is a further object of the invention to advance said translucent non-transparent strip over the surface onto which the image is projected by the mirror during inspection by the operator and in using the translucent non-transparent surface of the strip as a substitute for the ground glass.

A still further object of the invention consists in providing means for advancing the strip containing the records and notes and the sensitized film simultaneously.

A still further object of the invention consists in providing means whereby the channel-like exposed film container into which the film is delivered after exposure may be converted into a development container provided with means for severing the film strip which has been delivered into the container from the remainder of the film strip and capable of receiving a developing fluid by means of which the film contained in the box may be developed.

Further and more specific objects of the invention will be described in detail in the following specification.

The invention is illustrated in the accompanying drawings showing one embodiment of the invention. It is, however, to be understood that the embodiment shown in the drawings illustrates the invention by way of example only, in order to explain the principle of the invention and the best mode of applying the principle. It will be obvious to the expert skilled in this art that the details of the embodiment shown may be modified and a departure from the example illustrated is therefore not necessarily a departure from the principle of the invention.

In the drawings:

Figure 1 is a plan view of the camera assembly in operative condition;

Figure 2 is an elevational side view of the camera;

Figure 3 is an elevational sectional view of the camera, the section being taken along line 3—3 of Figure 1;

Figure 4 is an elevational sectional view of the camera, the section being taken along line 4—4 of Figure 1;

Figure 5 is an elevational sectional view of the camera, the section being taken along line 5—5 of Figure 1;

Figure 6 is an elevational side view of a part of the camera illustrating the transport rollers for the film and for the translucent strip and their driving mechanism;

Figure 7 is a partly sectional fragmentary view on an enlarged scale through the transport roller compartment, the section being taken along line 7—7 of Figure 4;

Figures 8 and 9 are a plan view and an elevational sectional view, respectively, of the exposed film receiving box;

Figure 10 is a perspective view of the said exposed film receiving box or container; and Figure 11 is a sectional elevational view of the said container, the section being taken along line 11—11 of Figure 8.

For a better understanding of the camera according to the invention and its construction it may first be mentioned that the camera is a film camera, making successive photographic pictures on a film strip which preferably consists of a sensitized paper and that the camera is also a reflex camera with a mirror permitting the inspection of an image to be thrown on the sensitized film strip before exposure. The film strip is not moved, as customary, within the focal plane of the camera but is moved in a plane which is substantially at right angles to the focal plane and in substantial parallelism to the bottom of the camera. Moreover the film strip is moved in a transverse direction which is at right angles to the optical axis of the camera. The image of the object or picture to be reproduced must therefore be thrown on the picture carrying film by means of a reflecting surface, on account of the relative position of the picture taking surface and the focal plane, and said reflecting surface is in this case formed by the mirror of the reflex camera which may be turned into such a position that the image formed in the focal plane is thrown to the film strip at right angles thereto. The film strip is unreeled from a reel or spool which is held in a lighttight storage chamber and it is fed into an exposed film container which may be converted into a developing tank. A translucent or semi-transparent strip which may consist of tracing paper or tracing cloth or the like may move along with the film in a plane parallel thereto and preferably over the top of the camera, the driving means for the strip being coupled with those of the film, and the position of the strip permitting the making of records and notes on the strip while moved over the mirror.

The camera according to the invention comprises a box structure 10 carrying the customary projecting bottom board or support 12 provided with racks along which the objective carrier frame 15 with the objective lens 16 may be moved, this movement being obtained by means of pinions (not shown) engaging the rack and mounted on a shaft 17 provided with a knob 18. The turning of the knob therefore produces the movement of the objective supporting frame towards the front or towards the rear. The objective frame is connected with the camera box 10 by means of the customary bellows 20.

The camera structure in all these respects does not differ from that of other cameras and it is also to be understood that the objective carrying frame and the section of the camera in front of the box is constructed and equipped in the well known and approved manner and that some or all of the usual and customary devices and mechanisms associated with the objective of a camera, such as the shutter mechanism, including the mechanism for timing and releasing the shutter, for regulating the shutter speed, and for the automatic and hand release of the shutter, and such as the customary diaphragm with its adjustment mechanism, the means for adjusting the height of the objective, the means for holding additional lenses, color filters, etc., range finding and focal distance adjusting mechanisms and the like are provided. All these mechanisms are part of the customary equipment of a camera and are not shown or described.

The camera box 10 comprises a bottom portion 28 which may be formed by a board or boards projecting on one or on both sides beyond the box and by two side walls 27, 29 one of them, 27, being merely provided with an entrance slot 50 for the film but otherwise imperforate, while the other side wall 29 is provided with two slots 53 and 54 near the upper and lower end of the box, respectively, and with a bore 22 through which a stub axle 24 may project which is supported by suitable flanged bearing sleeves 23.

The stub axle carries a side plate 25 of circular shape which is solidary with the axle or fixed thereon and which moves within a shallow circular recess of the side wall 29.

In the other side wall 27 of the box a similar shallow circular recess is provided within which a circular disk 26 may move. This disk carries a short pin or trunnion 31 which is axially aligned with the stub axle 24 and which projects into a shallow central depression 33 in the wall 27. The depression is preferably lined with a sleeve 34 which forms a bearing for the trunnion 31.

Between the two disks 25 and 26 the mirror 30 is supported which may either be mounted on a suitable base or may consist of a plate of glass or plastic provided with the usual silver coating which is carried by a suitable transverse member fixed to the two rotatable disks. The mirror 30 is so placed that it faces the objective and it is inclined with respect to the optical axis of an angle of approximately 45° in each of its two end positions which it may occupy. These two positions marked B and C are indicated in Figure 5 in full and in dotted lines, respectively.

In the position marked B the edges of the mirror rest on the two ledges 36 and 41 projecting from the front and the rear boards of the camera box, respectively; the mirror abuts against the two ledges. The mirror with the disks 25, 26 completely fills the compartment in a transverse direction and, when abutting against the two ledges 36 and 41 also forms a diagonal lighttight partition, subdividing the camera box and protecting the film strip in the lower part of the box light even if the lid of the camera at the top should be opened.

In order to fix the second position C of the mirror ledges 37 may be provided projecting from the rear wall 19 of the camera box 10.

As above explained the mirror 30 is rotatable around an axis passing through the common axis of the stub axle 24 and the trunnion 31. This axis which is indicated by the reference letter A in Figure 5 is located in the focal plane of the camera.

It will have been noted that, in contradistinction to the mirrors of the customary reflex cameras, the axis around which the mirror pivots or rotates in the camera according to the present invention is located in the focal plane of the camera and therefore the mirror cannot be moved out of reach of the light rays forming the picture. The mirror in this case moves through an angle of 90°. When in the position indicated at C in Figure 5 in dotted lines, the incoming rays from the objective, impinging upon the mirror, are reflected upwardly, while in the position indicated at B the light rays coming from the objective are reflected downwardly towards the film 60.

The upwardly directed reflection from the mirror in the position indicated at C produces an image on the ground glass plate 38 which is mounted in the top of the box. If the operator intends to use a translucent strip for producing the image the plate 38 may be made of clear glass and the strip 42 is applied against it while the image is viewed by the operator looking down towards the mirror.

Above the ground glass plate 38 the box 10 may be covered in a lighttight manner. This is preferably performed by a hinged top board 39 swingable around hinge 41 arranged along the front edge of the box. The hinged top board 39 may cover the entire top of the box or merely a portion thereof, the remainder of the top being covered by a fixed top wall 40 which so cooperates with the hinged board 39 that a complete and lighttight cover is formed when the hinged cover 39 is closed. The fixed top wall 40 must however be so arranged that it does not interfere with the image reflected upwardly by the mirror.

A strip 42 of translucent material, for instance of tracing cloth or tracing paper runs over the glass plate 38 and is held down on the plate by the top board 39. This strip as will be seen runs along the glass plate 38 and then passes through the slot 54 in the side wall 29. As seen in Figure 3 the strip is held between the glass plate 38 and the top board 39 the opposing faces of which are aligned with the slot 54.

On the side of the box closed by the side wall 27 a film roll storage chamber 43 is formed which consists of a lighttight box 44 housing and enclosing the film roll or reel. To introduce the film roll or reel one of the walls may be slidable or may be secured to the other walls in a detachable manner. Preferably the top wall is slidable and is dovetailed so that it can be removed in order to refill the chamber 43.

As will be seen in Figure 3 the chamber 43 may be of greater depth than the camera box 10 so as to accommodate as large a roll or reel as possible and this greater depth is made possible by the foot ledges 45 on which the camera may rest. The bottom board 12 may also be arranged so as to be flush with the foot ledges in order to seat and support all parts on a table or on another horizontal surface.

As already mentioned, the wall 27 separating the camera box 10 housing the mirror from the chamber 43 is provided with a slot 50 which leads from the chamber 43 into the box 10. Aligned with the slot 50 is a film holder and guide 51 for the film strip 60 which film guide may preferably be supported in said slot 50 and which extends through the entire length of the box and through a similar slot 53 aligned with slot 50 which is made in side wall 29. The film guide 51 is therefore arranged in a substantially horizontal plane during the normal use of the camera. Preferably the film guide consists of a metal strip, the edges of which have been bent or rolled over so that they may grip and hold the edges of the film strip in a well known manner, the sensitized layer of the film strip being turned upwardly towards the mirror. It will therefore be clear that the film strip section which, for the time being, travels through and is held within the camera box 10 may be exposed and receives its exposure from the mirror reflecting the image of the object received from the objective. As the mirror extends through the full transverse length of the camera box the section of the film strip within the box may be fully utilized. It will, however, be clear that it is also possible with suitable adjustments, or by masks covering part of the focal opening, to reduce the size of the surface which is exposed. This reduction will always be accompanied by a suitable note or indication on the strip 42 which travels along with the film.

On the other side of the camera box, adjacent to the side wall 29 a further chamber is preferably arranged which is also lighttight. The wall 29 in addition to the slot 53 through which the film holder and guide 51 passes is provided with a second slot 54 arranged at the level of the surface of the glass plate 38 which is of approximately the same width as the slot 53 and which serves for the passage of the translucent strip 42.

The two slots lead into a chamber 55 formed by the side walls 29 and 57 joining a front and rear wall. The central bore 59 in side wall 57 may also be provided with a flanged bearing sleeve 61 through which the stub axle 24 passes to the outside.

On the outside the stub axle 24 carries a crank arm 64 with a suitable handle 65, said crank being under the influence of a tension spring 66. The tension spring keeps the crank and thereby the stub axle 24 and the mirror 30 and its support firmly pressed against the ledges 36 and 41, thus sealing the lower half of the box diagonally in the position of the mirror in which the image is thrown on the film.

In the chamber 55 the drive rollers for the film 60 and the translucent strip 42 are housed. These rollers grip the two strips firmly between them and advance them simultaneously.

In order to obtain a firm grip on the strips the two rollers of a pair are pressed against each other. One roller of each pair 68, 70, respectively, is fixedly journaled in bearings 71, 72, and 73, 74, respectively, which are provided in the front and rear walls 75 and 76, respectively, by means of axles or spindles 78, 80, respectively. The spindle 78 is journaled near the top wall 97, while the spindle 80 is journaled near the bottom board 28 or preferably in a recess of the bottom board. The spindles 78 and 80 project to the outside and carry pulleys 81 and 83, respectively, over which a belt, cord and other flexible transmission means 90 runs. The two pulleys 81 and 82 therefore move in unison, thus producing equal advance speeds for the translucent strip 42 and the film strip 60.

One of the two spindles moreover carries a knurled knob 83 by means of which the two pulleys may be rotated by the operator to the desired extent.

In order to produce a firm grip between the two rollers of a pair the spindles 77, 79 of the second rollers of the two pairs are not fixedly journaled, but are slidably held in vertical guide pieces 84, 85; 86, 87 (Figures 4 and 7) and are pressed toward the cooperating roller of the pair by elongated hangers 88, 89 having approximately the shape of a closed loop or of a hook to which tension springs 92, 91 are attached. The tension springs are fixed on bolts projecting from the front and rear walls 75, 76, respectively. The springs 91, 92 produce a pressure between the rollers so that the strip 42 and film 60 are firmly gripped and are advanced practically without slipping.

As the film strip passes near the bottom plate 28 of the camera box the roller 70 has to be arranged in a slot or recess of the said bottom plate which slot must then be covered by a shield 93 to maintain lighttightness of the compartment 55.

The film holding guide member 51 may be provided with closed tubular portions at the ends which project into the slots and in the case of the portion projecting into the slot 53 also projects beyond the slot into the vicinity of the rollers 69 and 70. A closed flat tubular piece 96 is preferably inserted into the slot 57 and projects into the vicinity of the rollers 69 and 70 on one side while projecting also to a considerable extent to the outside.

This outside projecting portion enters into and is closely surrounded by a closed flat exposed film receiving box 100 which forms an elongated container of relatively considerable length. This container 100 preferably consists of two sections 101 and 102 tightly fitting into each other. Both sections may have substantially the shape of an open very shallow tray, but while the upper member has only short side walls which are at right angles to the bottom, the lower member 102 has its marginal portions 103 on three sides bent inwardly so that the bent portions are parallel to the base and form narrow grooves. These portions therefore are capable of holding tightly the upper section 102 on all sides except on one. Both sections, when inserted into each other, therefore form a closed very shallow channel or tube which is open on one side and which may be slid over the closed flat tubular holder 96 through which the film enters into the exposed film strip container 100.

The exposed film container 100 may be used as a developing tank and for this purpose the said container is provided near the open end with a sealing and cutting member 110 which is hinged to the member 102 by means of the pintle 111 near the front end of the member 102. The pintle is held by the two rolled in strips 108, 107 soldered or otherwise fixed to member 102.

The sealing member 110 is in the form of a lid tightly fitting on all sides over the end portion of the exposed film container. It has tightly fitting side walls 109 and 112, the former fitting over the lateral walls of the container while the latter fits over the open front end. The side wall 112 is provided with a sharp protruding edge so as to form a cutter. By means of this sharp edge the exposed film strip may be severed from the portion which is still held in the tubular guide member 96 of the camera. When the lid has been moved into its sealing position the container is tightly closed and neither light nor fluid may enter or leave the container.

The exposed film container box may be directly used as a developing tank. For this purpose the upper member 102 carries a flat filling nipple 120 which consists of a flat cylindrical box-like funnel member 121, soldered to the top of member 102, which has a closed top portion 122 provided with a filling opening 123. Below the filling opening a baffle 124 is arranged around which the fluid may flow into the box 100 through the filling opening 125 located below and covered by the baffle. Light penetrating through the opening 123 can therefore not be reflected into the interior of the box 100.

When a sufficient length of a film strip has been advanced into the exposed film container 100 and should now be developed, the container 100 is removed from the tubular guide piece 96 on which it was seated and when during such withdrawal movement the end of the tubular guide piece 96 is reached the lid member 110 is pressed down cutting the film strip and sealing the container 100. Developing fluid may now be introduced through the opening 123 and the film may be developed in daylight without using a dark room. When the developing process has been brought to an end the developing solution is removed and the film may now be taken out for further manipulation either by withdrawing it from the open end or by partly opening the container 100.

The operation of the device has already been described and need only be summarized. When a roll or spool with a sensitive paper or film strip has been inserted into chamber 43, the end of the film strip is drawn through the slot 50, the film guide 51, the slot 53 and through the space between the two rollers 69 and 70. The film strip is then passed through the closed tubular guide member 96. Preferably the focusing has been done before the insertion of the film strip, but if renewed focusing is necessary between the reproductions the length of the film strip held in the camera box during this operation is unusable as it will be exposed to light. The mirror 30 is then turned by means of crank 64, 65 and the exposure is made in the usual manner.

The strip is then advanced by operating the knob 83 so that a fresh section of the sensitized paper or film is introduced into the box 10. After each exposure the film strip is again advanced by turning the knob 83. In this way a length of the film strip which carries a number of exposures has been pushed into the exposed strip receiving container 100.

Together with the advance of the film strip the translucent strip 42 is advanced and the operator may note on the said strip the number or title of the object which has been reproduced, the size and other remarks which may relate to the treatment in the developer. When the full length of the strip has been advanced into the container a corresponding transparent strip with the notes is also available when the container 100 is now withdrawn from the guide member 96. After such withdrawal the sealing member 110 is pressed against the film strip the latter is cut and the container is now sealed and may be removed. The length of film or paper contained in the box 100 may now be developed as above described.

It will be clear that many of the details which have been above described are not of an essential nature and may be changed without in anyway departing from the essence of the invention, as defined in the annexed claims.

Having described the invention, what is claimed as new is:

1. A reflex camera assembly comprising a camera box having a plurality of compartments, one of said compartments being an exposure chamber provided with an objective lens system, a sensitized strip held in said camera box for exposure in a substantially horizontal plane, said strip extending transversely through all compartments of the camera box, along the bottom thereof and being adapted to be moved through all compartments of said box in a lighttight manner in a direction substantially at right angles to the optical axis of the objective lens system along the bottom of the camera box, a second translucent strip arranged near the top of the camera box above the exposure chamber substantially parallel to and being adapted to be moved along with said sensitized strip, a lighttight strip storage compartment adjacent one wall of the exposure chamber, a further lighttight compartment adjacent the opposite wall of the exposure chamber, both walls being provided with aligned substantially horizontal slots for a lighttight passage of the sensitized strip, the wall between said exposure chamber and said further box projecting above the exposure chamber and being provided with a further slot near its top for the passage of the translucent strip, a strip guide between the two aligned slots near the bottom of the camera box, supporting the strip on its underside and guiding its marginal portions, a pair of strip advancing rollers substantially aligned with the lower slot in the said further lighttight compartment, a pair of strip advancing rollers substantially aligned with the top slot in the said last named compartment, coupling means between the said pairs of rollers, manual means for operating one of said pairs of rollers and reflecting means within said camera box arranged between said strips and adapted to be turned either towards the one or towards the other strip.

2. In a camera assembly as claimed in claim 1, in addition, means for pressing the two rollers of a pair towards each other, said means including axles on said rollers, vertical guides on the walls of the compartment for the axles of one roller of the pair, hangers on said rollers and springs attached to them for drawing the axles of the rollers which are movable in the vertical guides towards the other rollers.

3. A camera for the serial reproduction of originals which require individual camera adjustments, comprising a horizontally supported camera completely closed at one end and having a closed end provided with a slot near the bottom at the opposite end, said camera being subdivided by partition walls into a central exposure compartment and in two side compartments, each of the latter communicating with the central exposure compartment by means of a narrow slot near the bottom, all the aforesaid slots being aligned in a horizontal plane, a sensitized strip, stored in the side compartment at the completely closed end of the camera and running straight along the camera bottom through the slots into and out of the exposure compartment and into the side compartment on the slotted side of the camera and out of said compartment to the outside, an adjustable optical system with its axis arranged above said sensitized strip and at right angles to the direction of movement of the sensitized strip, a glass plate at the upper end of the central exposure compartment and a lid for covering the same and closing the compartment in a lighttight manner, a mirror in said central exposure compartment rotatable around a horizontal axis parallel to the direction of movement of the sensitized strip adapted to be moved into two positions, a first position in which the mirror is turned towards the objective and the sensitized strip, and a second position in which the mirror is turned towards the objective and the glass plate, a support for the mirror including a transverse supporting plate filling the exposure compartment completely from one end to the other and flanked by two circular disks fixedly joined to said supporting plate, and located within recessed portions of the partition walls separating said central exposure compartment from the side chambers, transverse ledges projecting from the upper and lower front and rear wall respectively of the exposure compartment towards the axis of rotation of the mirror for resting the mirror supporting plate and mirror in a lighttight manner in the first position of the mirror, the mirror supporting plate, when in its first position, thus dividing the exposure compartment into completely separate chambers, the lower chamber being separated from the upper chamber in a lighttight manner by the mirror and mirror supporting plate resting on the projecting edges, an axle reaching through the side chamber of the camera provided with a slot to the outside connected with the mirror supported plate, means for rotating said axle, means for holding said axle in one of its positions, rollers in the said side chamber provided with a slot near the bottom of the camera aligned with the slot to grip the sensitized film running through the slot into the side chamber and to the outside, and means projecting through the walls of the said side chamber for rotating said gripping rollers.

4. A camera as claimed in claim 3 wherein the lid covering the exposure compartment is provided with a recess, a pair of gripping rollers mechanically connected with the gripping rollers of the sensitized film within the side chamber containing the last named gripping rollers, the said pair of gripping rollers being arranged near the top of said side chamber and being aligned with their gripping portions with the surface of the glass plate, the partition between the side chamber containing the gripping rollers and the exposure chamber being provided with a further slot, a further strip running through the recess of the lid covering the exposure chamber and over the glass plate through the said slot in the partition and between the gripping rollers near the top of the side chamber, the said strip being advanced by the said rollers at a rate which corresponds to the rate of advance of the sensitized strip, said strip containing notes made in connection with the making of photographic reproductions, the section of said further strip containing the notes being thus automatically correlated by their position on the strip to the pictures made on the sensitized film.

JACOB J. WOLF, Jr.

References Cited in the file of this patent
UNITED STATES PATENTS

| Number | Name | Date |
|---|---|---|
| 1,057,397 | Beidler | Mar. 25, 1913 |
| 1,377,454 | Beidler | May 10, 1921 |
| 1,755,452 | Motti | Apr. 22, 1930 |
| 1,979,719 | Weisse | Nov. 6, 1934 |
| 1,980,546 | Petit | Nov. 13, 1934 |
| 2,234,345 | Hershberg | Mar. 11, 1941 |
| 2,403,717 | Harvey | July 9, 1946 |
| 2,483,014 | Land | Sept. 27, 1949 |